United States Patent [19]

Byerley, III et al.

[11] Patent Number: 5,448,161

[45] Date of Patent: Sep. 5, 1995

[54] TRANSFORMER-COUPLED PHOTODIODE CIRCUIT FOR LIGHTNING AND OTHER LIGHT PULSE DETECTION

[75] Inventors: Leon G. Byerley, III; Alburt E. Pifer, both of Tucson, Ariz.

[73] Assignee: Lightning Protection Technology, Tucson, Ariz.

[21] Appl. No.: 920,181

[22] Filed: Jul. 24, 1992

[51] Int. Cl.⁶ ............................................. G01R 31/00
[52] U.S. Cl. ........................................ 324/72; 324/96; 73/170.24; 340/601; 356/226
[58] Field of Search .................. 324/72, 96, 457, 501; 356/226; 73/170.24; 340/600, 601; 361/139, 173

[56] References Cited

U.S. PATENT DOCUMENTS

| | | | |
|---|---|---|---|
| 3,467,858 | 9/1969 | Burnett | 324/501 |
| 3,790,884 | 2/1974 | Kohl | 324/72 |
| 4,345,482 | 8/1982 | Adolfsson et al. | 324/244.1 X |
| 5,396,220 | 3/1995 | Markson et al. | 340/600 |

*Primary Examiner*—Kenneth A. Wieder
*Assistant Examiner*—Glenn W. Brown
*Attorney, Agent, or Firm*—Ogram & Teplitz

[57] ABSTRACT

An efficient optical radiation detector for lightning or other light signals such as pulses, bursts, flashes, and steady fluctuations. A silicon photodiode (or similar light-sensitive silicon device) is arranged to receive light signals (infrared, visible, ultraviolet, broadband, etc.) of interest. The photodiode is connected across the primary winding of a properly-designed transformer. The transformer-coupled photodiode circuit gives AC coupling, photodiode bias, voltage gain, and several other desirable detector characteristics. Light fluctuations on the photodiode produce variations of photocurrent in the transformer primary circuit which, in turn, induce current in the secondary winding and circuit of the transformer. The current induced in the secondary circuit of the transformer is used to do useful work (such as energize an audible alarm, increment a counter, latch a relay, etc.) or it is further amplified and processed, or combined with other signals to make an event detector such as a lightning sensor. The transformer-coupled photodiode circuit provides a general purpose light-change detector that is particularly useful as the optical sensor element of a lightning detector including any of a variety of so-called "lightning coincidence detectors". The chance of a "false" lightning detection is greatly reduced by the combination of an electric or magnetic field-change detection device with the transformer-coupled photodiode circuit.

31 Claims, 3 Drawing Sheets

TRANSFORMER-COUPLED PHOTODIODE CIRCUIT FOR LIGHTNING AND OTHER LIGHT PULSE DETECTION

BACKGROUND OF INVENTION

This invention relates to light sensing devices and more specifically to light-pulse or light-change detection systems such as lightning detection systems using light-sensitive silicon devices.

In 1752, Benjamin Franklin arranged for corona current to ring bells fitted to an air gap in a long lightning conductor thereby making the first lightning detector of historical record. Since then, lightning detectors have improved and are now used for a variety of purposes.

Today, accurate and reliable lightning detection is needed more than ever. Every year, hundreds of people are injured or killed by lightning. Worldwide, annual property damage due to lightning now amounts to many billions of dollars.

Accurate and reliable lightning detection can prevent many of these injuries and damages. Lightning detectors can provide early warning of lightning threats to people and signal them to seek safe shelter. Lightning detectors can provide signals for the manual or automatic protection of valuable equipment from the direct and indirect effects of lightning. Operators of computer facilities can be alerted to use backup power supplies before power interruptions and transients due to thunderstorms occur.

Lightning detectors are finding many new uses. They have recently been used to help predict "microbursts" associated with thunderstorms. Microbursts are the suspected cause of several deadly aircraft accidents.

There are several well-known methods used to detect lightning. Some lightning detectors (traditional "flash counters" and sferics detectors) are based on sensing the radiated fast or slow electric field changes that are typical of lightning. These detectors use frequency-selective filters to bias their response in favor of lightning signals. These detectors are particularly limited by poor noise discrimination and consequent false lightning indications.

Some lightning detectors are based on vibrating-reed or rotating-vane electrostatic flux meters (field mills). These detectors sense the steady level and slow variations of electric fields as clouds nearby become electrified, produce lightning and dissipate or recede. Field mills are expensive, limited in detection range, mechanically complex, and can at times indicate "thunderstorm" during a dust storm or other non-threatening situation.

Other lightning detectors are based on point-discharge (corona-current) sensors in which field-emissions from a sharp elevated conductor are amplified to give an indication of the sign and magnitude of the vertical electric field and electric field changes. Corona-current sensors are less complex than field mills, but can give false hazard indications (or fail to give hazard indications) when space charge and the motion of space charge near the ground interferes with measurement of the charge aloft.

Gated, wideband, magnetic direction finders as described in U.S. Pat. Nos. 4,198,599, 4,115,732, and 4,806,851 issued to Krider et al., are in wide use throughout the world. These detectors are biased to trigger on the signals radiated by ground discharges. They measure bearing angles and other parameters of ground discharges. Single-station versions of these sensors provide estimates of the range to ground discharges. Single-station direction finders are relatively expensive and must be carefully located to prevent false alarms and minimize errors in direction measurement.

Low-cost, hand-held electrical, optical, and electro-optical lightning detectors have come into use in recent years. These detectors require an alert, educated operator to make measurements and assess hazards. Sensors that detect only optical radiation or only electric field changes may give false alarms with natural and man-made variations in light or when used near noise sources such as electronic and electrical equipment. These detectors often require relatively complex signal processing and power supply circuits. Some of these instruments are highly directional and must be pointed.

Lightning coincidence detectors are well known in the art. Lightning coincidence detectors are discussed in: Journal of Geophysical Research, Vol. 65, No. 7, pg. 1927-1931, July 1960, "Electric-Field Changes and the Design of Lightning Flash Counters" by M. Brook and N. Kitagawa; Conference Proceedings of the 1991 International Aerospace and Ground Conference on Lightning and Static Electricity, pg. 100-1 to 100-3, "Portable Combined Optical and Electric Field Change Intracloud Lightning Detector," by R. Markson; and, in a paper presented at the 21st International Conference on Lightning Protection, 1992, Berlin, titled "An Electro-Optical, Lightning Detection, Classification and Ranging Sensor for Automatic Lightning Protection and Human Warning", by L. G. Byerley, A. Pifer, and K. Cummins [all incorporated hereto by reference].

Commercially, lightning coincidence detectors are available from Lightning Location and Protection, Inc. (Tucson, Arizona), and Airborne Research Associates (Cambridge, Massachusetts).

Some complex solutions to lightning detection are U.S. Pat. No. 4,095,221, titled "Electrical Storm Forecast System", issued Jun. 13, 1978 to Slocum, Jr; U.S. Pat. No. 3,715,660, titled "Determining Distance To Lightning Strokes From A Single Station", issued Feb. 6, 1973 to Ruhnke; and, U.S. Pat. No. 4,422,037, titled "Storm Warning Method and Apparatus", issued Dec. 20, 1983 to Coleman which teach much more complex solutions to the problem of lightning detection.

Clearly, each present lightning detection technique is lacking in one or more important capabilities. A need exists for a new type of short-range lightning detection device that is simple, reliable, accurate, free of false alarms, immune to noise, easily deployed and inexpensive.

SUMMARY OF THE INVENTION

The invention creates a general purpose light change detection device that is particularly useful as a lightning detector or as an element of a lightning detection system such as any of a variety of "lightning coincidence detectors" commonly known in the art. Such lightning coincidence detectors have shown to be immune to random optical and electromagnetic noise and seldom produce false lightning indications.

A silicon photodiode (or similar light-sensitive silicon device) is arranged to receive light radiation: directly, through a lens, through a diffuser, from a reflector, through a slit or collimator, through a filter, or through some combination of the aforementioned. The photodiode is operated in the photovoltaic mode by connecting it across the primary winding of a transformer. Photocurrent from the photodiode circulates in the primary winding of the transformer. Changes in photocurrent, caused by changes in light on the photodiode, induce currents in the secondary circuit of the transformer. Steady photocurrent and slow variations of photocurrent induce little or no current in the secondary winding of the transformer. The current in the secondary winding of the transformer is either used directly to cause indications of light changes, e.g., bursts of light from lightning discharges, or is processed for use by an operator and/or another device.

Silicon photodiodes and the like are used as the active sensing element for this invention for a number of reasons. Silicon photodiodes are rugged and inexpensive devices. The spectral response of photodiodes can be tailored by the manufacturer to emphasize regions of the spectrum with wavelengths from a fraction of a micron to well over 1 micron. For the application of the invention as a lightning detector, it is fortuitous that lightning radiates strongly at optical frequencies that are near the peak response region of common photodiodes.

Silicon p-n junctions are sensitive to light. Energy supplied to a p-n junction affects the current carrier population. In a photodiode, this property is utilized and optimized. Shining light of sufficient energy into a silicon diode boosts electrons from the valence band to the conduction band where they function as current carriers. In a photodiode the p doped region is mounted so that it is exposed to light. Incident photons generate minority carriers in the p and n regions that must diffuse to the p-n junction where they are collected to give photocurrent. Carriers are generated and driven through the depletion region by the electric field between the p and n regions. Carriers are also generated near the backside of the device, but they contribute little photocurrent because of their distance from the p-n junction and most are claimed by recombination before reaching the junction. Conductive contacts are arranged on the front and back surfaces of the semiconductor material to enable photocurrent to be taken from the device.

Photodiodes are made in single- and poly-crystalline form with surface areas ranging from a few thousandths of a square inch to hundreds of square inches. Light-to-electrical energy conversion efficiency for photodiodes of single-crystal form is greater than 10%.

Photodiodes are well known in the art. U.S. patents utilizing photodiodes to detect lightning include: U.S. Pat. No. 3,937,951, titled "All-Sky Photoelectric Lightning Detector Apparatus", issued Feb. 10, 1976 to Krider; and U.S. Pat. No. 3,940,607, titled "Photo-Electric Lightning Detector Apparatus", issued Feb. 24, 1976 to Krider [both incorporated hereto by reference].

U.S. Pat. No. 3,937,951 uses a pair of position sensing photodiodes of a conventional quadrature or dual-axis type to detect the location of lightning in a full 360 degrees in azimuth. U.S. Pat. No. 3,940,607 uses a lens to focus a relatively narrow field of view on a photodiode or series of photodiodes to detect the location and vertical speed of lightning.

A related Krider patent, U.S. Pat. No. 3,934,259, titled "All-Sky Camera Apparatus For Time-Resolved Lightning Photography", issued Jan. 20, 1976 [incorporated hereto by reference], uses a pair of all-sky cameras, each equipped with a 220 degree Fisheye-Nikkor lens, to determine the time development of lightning discharge.

In order for the photodiode to provide a linear response to changes in light level, it must be connected in parallel with a resistance that is low enough to prevent the photodiode junction from accumulating charge. In this so-called photovoltaic mode of operation, with the proper load across the photodiode, photocurrent output is proportional to the intensity of the light falling on the photodiode. Fluctuations of light cause photo current fluctuations to be superimposed on any steady photo current due to ambient light. Standard photodiode circuit practice is to amplify the voltage across the resistor in parallel with the photodiode with an AC-coupled amplifier. Because the resistance across the photodiode must be small for linear response (on the order of 10 ohms for a 1 square centimeter device), a high-gain amplifier designed for a low-impedance source must be used.

The AC-coupling provided by a transformer eliminates output signal due to the current from ambient light. Since transformers have no DC response (except magnetic saturation effects that one skilled in the art can design against or use to advantage), the steady photocurrent due to ambient light does not appear as output, and the need for an amplifier (and power supply, etc.) is eliminated (in many cases) by transforming a low-impedance current source (the photodiode) to a high impedance load. For lightning flashes and other high-power light pulses, the voltages across the load on the secondary winding of a step-up transformer are (for many applications) large enough to be used directly to do useful work without amplification.

In the canonical form, with only two, properly selected components (a silicon photodiode and a transformer), this invention creates a light-change detector that:

1. Provides bias for the photodiode (by proper choice of DC resistance of the primary winding of the transformer) that gives linear response to light level changes over a wide dynamic range and under all ambient light conditions.
2. Gives desirable spectral response through proper selection of photodiode. Ultraviolet, visible, or infrared radiation can be emphasized if desired.
3. Gives desirable frequency response through proper design of the transformer and selection of the photodiode.
4. Has large voltage gain (if desired) with noise near the theoretical thermal limits.
5. Requires no power supply, i.e., it is a passive detector and provides useful signal without batteries or connections to sources of AC power.
6. Provides proper impedance matching to the photodiode to give efficient light-to-electrical energy conversion.
7. Is scalable, and can be made as large (for high signal power) or as small (for low signal power) as desired through the selection of appropriate photodiodes and transformers.

Lightning radiates large, abrupt, electromagnetic fields accompanied by the simultaneous emission of copious amounts of light. In one embodiment of the invention, a magnetic field change detector is used in conjunction with the transformer-coupled photodiode detector to make a lightning coincidence detector. Both the magnetic field change detector and the light-pulse detector based on the transformer-coupled photodiode respond to natural and man-made sources of noise. Very few noise sources however, produce rapid, large amplitude and nearly simultaneous signals across the optical and radio-frequency portions of the electromagnetic spectrum. For this reason, lightning coincidence detectors provide a means for effective rejection of noise and give high selectivity to signals of lightning origin. Lightning coincidence detectors are operable in noisy environments that would cause conventional lightning detectors to give false alarms.

Lightning coincidence detectors that utilize the optical component of lightning emissions in conjunction with a radio frequency component have the significant advantage that the detection range of the combined sensor will fall off approximately as one over the distance to the lightning discharge squared, i.e., such coincidence detectors provide desirable cutoff of lightning detection with range. A rapid fall-off of lightning detection efficiency with range greatly reduces so-called "nuisance alarms" produced by the detection of lightning that occurs beyond a range of interest.

Other field and field change sensors include fast electric field change detectors, slow electric field change detectors, electrostatic field sensors, and other types of magnetic or inductive field change detectors and are useful for lightning coincidence detectors.

It is readily apparent to a person skilled in the art that the invention is adaptable to many similar uses. Other applications for the invention include portable personal lightning detectors, microburst and windshear detection systems, electrical equipment protection devices, special helmets or goggles to protect the eyes of welders from the light from an electric arc, adaptive filters for night-vision goggles, flash-blindness filters for prevention of temporary or permanent loss of vision when the human eye is exposed to the optical pulse from the detonation of a nuclear device, and other adaptive optical attenuators, shutters, and filters.

U.S. Pat. No. 4,996,473, titled "Microburst/Windshear Warning System", issued Feb. 26, 1991 to Markson, et al. [incorporated hereto by reference] teaches that a lightning detection device is useable for predicting microbursts.

U.S. Pat. No. 4,276,576, titled "Lightning Activated Relay", issued Jun. 30, 1981 to Uman et al.; U.S. Pat. No. 3,753,117, titled "Severe Weather Warning Device", issued Aug. 14, 1973 to Downing et al.; and, U.S. Pat. No. 2,265,868, titled "Protection of Apparatus From Lightning Disturbances", issued Dec. 9, 1941 to Schonland, [all incorporated hereto by reference] teach how a lightning detection device isolates electrical equipment from the electric power mains and thus protects the electrical equipment from power surges.

The invention, together with various embodiments thereof, will be more fully explainedby the following drawings and their accompanying descriptions.

DESCRIPTION OF THE PREFERRED EMBODIMENT

Figure 1:
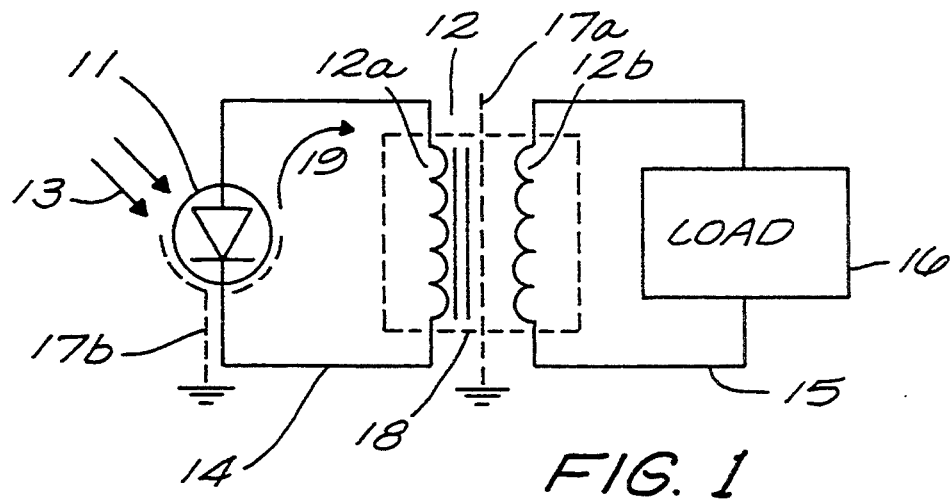
FIG. 1 shows the invention in canonical form.

FIG. 1 shows a simple circuit utilizing the invention.

Photodiode 11 is connected across the primary winding 12a of transformer 12. Light radiation 13 striking photodiode 11 produces photocurrent 19 in the primary circuit 14 and the primary winding 12a of transformer 12.

Under steady illumination, a constant current passes in the primary circuit 14. Under steady or slowly fluctuating illumination, little or no current is induced in the secondary winding 12b of the transformer 12.

A change of light on photodiode 11, say due to lightning, produces a change of current in the primary winding 12a which in turn induces current in the secondary winding 12b of the transformer 12.

The number of turns on the primary and the secondary windings 12a and 12b are changeable to give more or less voltage across load 16 to suit the needs of different loads.

In one embodiment, the size, the number, and the connection of a plurality of photodiodes in parallel are varied to give different levels of photocurrent in the primary winding 12a of the transformer 12.

In another embodiment, the size, the number, and the connection of a plurality of photodiodes in series are varied to give different levels of photocurrent in the primary winding 12a.

The preferred embodiment uses a step-up transformer with fewer turns on the primary winding 12a than on the secondary winding 12b. A person skilled in the art readily sees that the turns ratio, the frequency response, the DC resistance of both windings and the magnetic coupling efficiency of the transformer are optimizable to suit detector requirements.

The preferred embodiment includes electrostatic shield 17a in transformer 12 to prevent capacitive coupling between the primary and secondary windings 12a and 12b of the transformer 12.

The preferred embodiment includes magnetic shield 18 around transformer 12 to prevent response of the transformer 12 to external magnetic field changes. Finally, the preferred embodiment includes electrostatic shield 17b over photodiode 11 to restrict the response of the photodiode 11 to optical signals.

Load 16 is an auditory alarm, a visual indicator, a fixed resistor, a relay, an electro-mechanical counter, a fiber-optic transmitter, a radio transmitter, a pneumatic or hydraulic transmitter or the like depending on the application of the invention.

Figure 2:
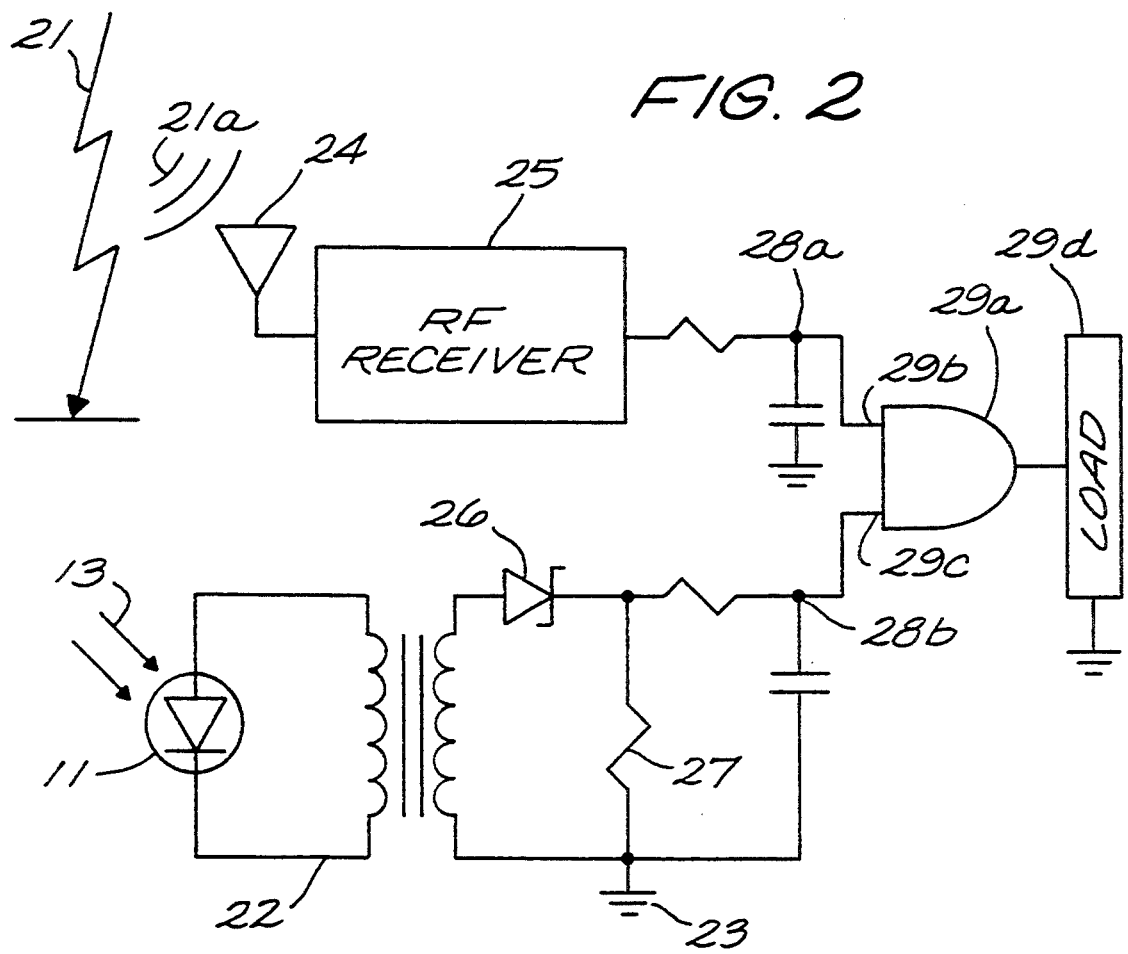
FIG. 2 shows the invention used as an element of a lightning coincidence detector.

FIG. 2 shows a simple lightning coincidence detector utilizing the invention.

Lightning 21 radiates electromagnetic fields 21a and optical pulse(s) 13. Antenna 24 receives electromagnetic radiation 21a and provides signal to RF receiver 25. Likewise, transformer-coupled photodiode circuit 22 detects the light pulse 13. Diode 26 passes only the positive-going portion (voltages greater than the forward voltage drop of the diode) of the output of transformer-coupled photodiode circuit 22. Resistor 27 provides a discharge path for RC network 28b. The outputs of RF receiver 25 and transformer-coupled photodiode circuit 22 are delayed by RC networks 28a and 28b respectively and used as inputs to gate 29a. Delay networks 28a and 28b are set to adjust for differences in signal level and the different rates of rise of the electromagnetic and optical components of the lightning emissions. In the preferred embodiment, delay networks 28a and 28b are shown implemented with RC networks, persons skilled in the art readily see that other similar implementations are possible.

Gate 29a energizes load 29d when and only when both gate inputs 29b and 29c are active at the same time.

Figure 3:
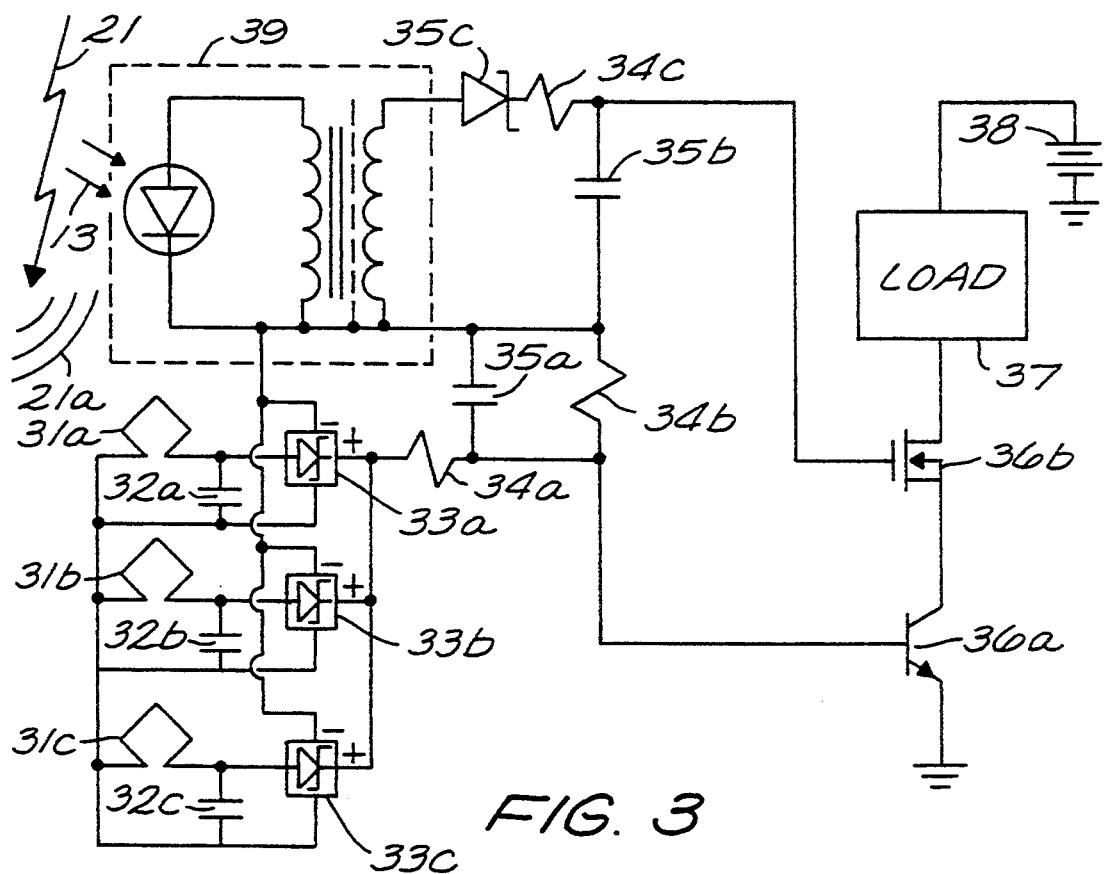
FIG. 3 shows the invention used as an element of a lightning coincidence detector comprised of one or more loop antennas used to detect one or more components of the magnetic field change due to lightning in coincidence with a signal provided by the invention.

FIG. 3 shows a lightning coincidence detector utilizing the invention in conjunction with one or more loop antennas to detect one or more components of the magnetic field.

Lightning 21 radiates light pulse 13 and simultaneous magnetic field 21a. Loop antennas 31a, 31b, and 31c are arranged, in this case, to respond to the North-South, East-West, and vertical components of radiated magnetic field 21a respectively. The peak voltage out of each loop antenna 31a, 31b, and 31c, is proportional to the rate of change of magnetic flux through the loops.

For the loop antennas the number of turns, the area of the turns, the core material, and the self-resonant frequency are some of the variables optimizable for a lightning detector by one skilled in the art. In the preferred embodiment, antennas 31a, 31b, and 31c are made resonant at a frequency that is dominant in the spectrum of radiation from lightning discharges to give additional selectivity to the magnetic portion of the coincidence detector. Capacitors 32a, 32b, and 32c across antennas 31a, 31b, and 31c respectively make resonant circuits of each magnetic field receiver.

Full wave rectifiers 33a, 33b and 33c isolate the magnetic channels and give equal response to radiated signals with positive-or negative-going initial transitions to charge capacitor 35a through resistor 34a. The rectification and combination of signals from all of the antennas gives an approximate omnidirectional response. The time constant of resistor 34a charging capacitor 35a is adjusted to give adequate time for the optical signal to reach a significant level. Resistor 34b discharges capacitor 35a so that the charge on capacitor 35a does not remain between one lightning event and another. When the voltage on capacitor 35a exceeds approximately 0.6 volts, npn transistor 36a turns on, opening the coincidence window for a light pulse typical of lightning to be detected by transformer-coupled photodiode circuit 22 in response to light pulse 13.

If the light pulse 13 is typical of lightning, and is of sufficient amplitude, then the voltage that appears on capacitor 35b (when charged through diode 35c and resistor 34c) will turn on MOSFET 36b to fulfill the coincidence criterion. During the time that transistor 36a is conducting and MOSFET 36b is conducting, current from power supply 38 can pass through load 37. Load 37 is an audible alarm, a visual indicator, an electro-mechanical counter, a fiber-optic transmitter, a pneumatic or hydraulic or radio transmitter, a latch or relay, or the like.

The preferred embodiment makes power supply 38 independent of external conductors to prevent lightning-caused transient damage to the lightning coincidence detector and any connecting equipment. For the same reason, the preferred embodiment uses signalling means from load 37, that do not rely on metallic conductors external to the sensor.

Figure 4A:
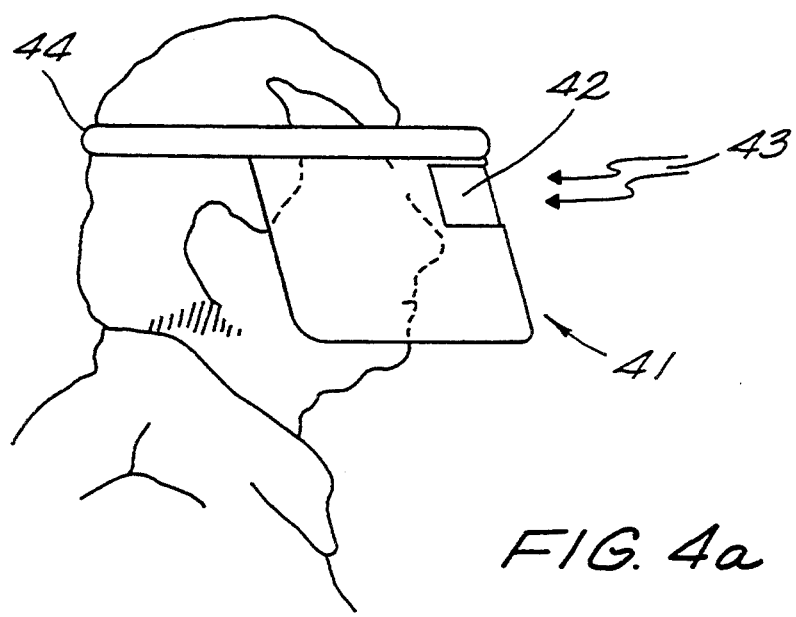
FIG. 4a shows the invention embodied as the trigger circuit in an automatic adaptive optical filter used to protect the eyes of a welder from the light from an electric arc.

FIG. 4a shows the invention embodied as the trigger circuit in an automatic adaptive optical filter used to protect the eyes of a welder or other operator from the light from an electric arc or the like. Welder's mask 41 holds optical filter 42. Optical filter 42 is electrically controlled by a flash detection circuit utilizing the invention. Under normal light conditions, optical filter 42 allows sufficient light to penetrate so that the welder or operator can see through the optical filter 42. When a light flash 43 is detected by the invention, the optical filter 42 darkens rapidly to reduce the light passing therethrough, thus protecting the eyes of the worker.

The optical filter 42 and mask 41 are held on the user's head via headset 44.

Figure 4B:
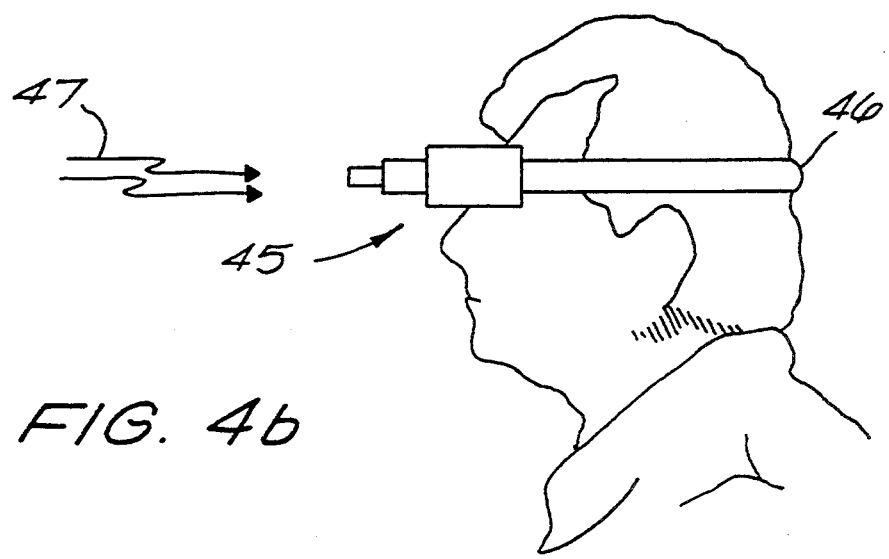
FIG. 4b shows goggles utilizing the invention.

FIG. 4b shows the invention as embodied as the trigger circuit in goggles 45 intended for flash blindness prevention. Goggles 45 attach to a user's head via headset 46. Goggles 45 cover the user's eyes.

For flash blindness prevention, the invention provides a trigger circuit that allows the user's eyes to be protected from a light flash 47 such as results from the detonation of a nuclear device. The invention provides protection from both temporary and permanent blindness due to light flashes.

For night vision goggles, the invention allows the user's eyes to be protected from loss of night vision due to a light flash. The invention provides a trigger signal to the optical filter (not shown) in the goggles 45 to prevent light flashes from reducing the user's night vision. The invention combined with other circuitry in the goggles 45 allows the optical filter to operate normally immediately after the light flash 47.

Figure 5:
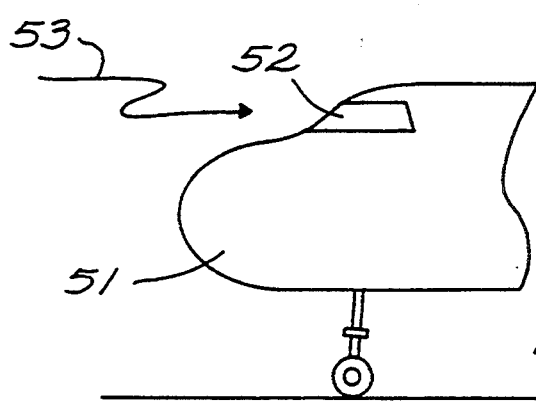
FIG. 5 shows an aircraft window utilizing the invention.

FIG. 5 shows the invention as embodied in a aircraft window. Aircraft 51 includes an adaptive optical filter in windshield 52. Optical filter windshield 52 is controlled by electrical signals from a light flash detector (not shown) utilizing the invention. When a light flash 53 is detected, the optical filter windshield 52 reduces the amount of light passing therethrough and thus protects passengers from blindness from a nuclear bomb burst, a lightning flash or the like.

Figure 6:
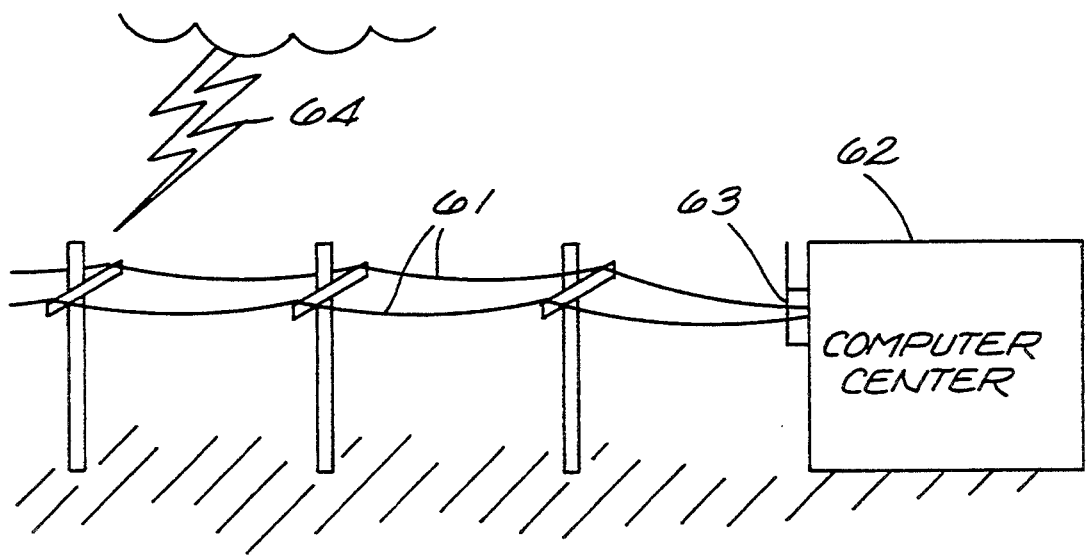
FIG. 6 shows the invention embodied as an electrical equipment protection device.

FIG. 6 shows the invention as embodied as an electrical equipment protection device. Metallic conductors 61 supply electrical power and carry signals to and from the electrical equipment 62. Lightning detector and shutdown device 63 is interposed between the metallic conductors 61 and the electrical equipment 62. When threatening lightning conditions occur, the lightning detector and isolation switch(es) 63 cause the computer center 62 to be electrically isolated from the metallic conductors 61 thus protecting electrical equipment 62 from unanticipated power fluctuations and surges caused by lightning 64.

Electrical equipment 62 represents any type of electrical equipment that could be damaged by power surges, power fluctuations or unanticipated power outages.

It is clear from the forgoing that the present invention represents a new and useful device for the detection of lightning, light flashes and the like.

What is claimed is:

1. An apparatus for detecting lightning comprising:
  a) a photodiode means for converting light induced by a lightning pulse into electric current, said photodiode means being positioned to receive ambient light;

b) a transformer comprising a primary winding and a secondary winding, said photodiode means being directly connected across said primary winding, said transformer being the exclusive means for boosting electrical signals from said photodiode means; and, c) an output means electrically connected to said secondary windings, for communicating electrical signals representative of light changes to the external world.

2. The apparatus according to claim 1 further comprising:

a) a field change detection means for detecting a field change associated with lightning; and, b) a logical-AND gate electrically communicating with said secondary winding of said transformer and said field change detection means and generating electrical signals therefrom.

3. The apparatus according to claim 2 wherein said field change detection means is a magnetic field change detector.

4. The apparatus according to claim 2 wherein said field change detection means is an electric field change detector.

5. The apparatus according to claim 2 wherein said field change detection means is an electrostatic field change detector.

6. The apparatus according to claim 2 wherein said field change detection means is an inductive field change detector.

7. The apparatus according to claim 1 further comprising:

a) a field change detection means for detecting a field change associated with lightning; and, b) signal combining means for generating a single electrical signal based upon signals from said secondary windings and said field change detection means.

8. The apparatus according to claim 7 wherein said field change detection means is a magnetic field change detector.

9. The apparatus according to claim 7 wherein said field change detection means is an electric field change detector.

10. The apparatus according to claim 7 wherein said field change detection means is an electrostatic field change detector.

11. The apparatus according to claim 7 wherein said field change detection means is an inductive field change detector.

12. The apparatus according to claim 1 wherein said output means includes an auditory alarm.

13. The apparatus according to claim 12 further including means for adjusting a tonal quality of said auditory alarm based on the amplitude of said electrical signals from said output means.

14. A machine for detecting lightning pulses comprising:

a) a light sensitive means for converting light energy from lightning into electrical energy, said light sensitive means being positioned to receive ambient light;

b) a transformer comprising a primary winding and a secondary winding, said light sensitive means being electrically connected directly across said primary winding such that said light sensitive means and said primary winding are part of a complete circuit and wherein electrical current from said secondary winding is indicative of said light energy, said transformer being the exclusive means for boosting electrical signals from said light sensitive means; and, c) means for communicating a signal to an operator, said means for communicating being responsive to said electrical current from said secondary windings.

15. The machine according to claim 14 further including an output means for communicating electrical signals from said secondary winding to the external world.

16. The machine according to claim 15 further including an amplifier means electrically connected to said secondary winding for amplifying an electrical signal induced in said secondary winding.

17. The machine according to claim 15 wherein said output means includes an auditory speaker.

18. The machine according to claim 15 wherein said output means includes a visible light means for producing a visual light alarm.

19. The machine according to claim 15 wherein said output means includes a display screen.

20. The machine according to claim 15 wherein said output means includes a radio transmitter.

21. The machine according to claim 15 further comprising a magnetic field detection means for detecting a magnetic field change associated with lightning, said magnetic field detection means electrically connecting said secondary winding with said output means when a magnetic field change is detected.

22. The machine according to claim 15 further comprising a magnetic field detection means for detecting a magnetic field change associated with lightning, and signal combining means for combining signals from said magnetic field detection means and signals from said secondary winding.

23. The machine according to claim 15 wherein said output means includes a non-metallic conductor link means for communicating signals to an external world without lightning generated interference.

24. The machine according to claim 15 further comprising a shield means for protecting said light sensitive means and said transformer from electromagnetic and electrical fields.

25. A method of detecting lightning comprising the steps of:

a) placing a light sensitive means for converting light energy into electrical energy in an ambient light position to be exposed to light produced from lightning;

b) biasing said light sensitive means with a transformers, said transformer being the exclusive means for boosting electrical signals from said light sensitive means; and, c) based on electrical energy from said transformer, communicating a detection signal to an operator.

26. The method of detecting lightning according to claim 25 wherein the step of biasing said light sensitive means is followed by the step of communicating said electrical energy to the external world.

27. The method of detecting lightning according to claim 26 wherein the step of placing said light sensitive means in a position to be exposed to light produced from lightning is preceded by the further step of positioning at least one electrical antenna to detect magnetic field changes due to lightning and allowing communication of said electrical energy to the external world only when magnetic field changes are detected.

28. The method of detecting lightning according to claim 27 wherein said at least one electrical antenna includes three electrical antenna positioned substantially perpendicular to each other.

29. The method of detecting lightning according to claim 25 wherein the step of placing said light sensitive means in a position to be exposed to light produced from lightning is preceded by the further step of positioning at least one electrical antenna to detect magnetic field changes due to lightning.

30. The method of detecting lightning according to claim 29 wherein said at least one electrical antenna positioned to detect magnetic field changes due to lightning includes three electrical antennas positioned substantially perpendicular to each other.

31. The method of detecting lightning according to claim 25 further including the step of providing a warning to a user based upon electrical activity from said transformer.

* * * * *